United States Patent
Huang

(10) Patent No.: US 7,375,896 B2
(45) Date of Patent: May 20, 2008

(54) DIGITAL LIGHT-PROCESSING PROJECTION APPARATUS AND BEAM SPLITTER MODULE THEREOF

(75) Inventor: Junejei Huang, Guei-Shan Hsiang (TW)

(73) Assignee: Delta Electronics, Inc., Taoyuan County (TW)

( * ) Notice: Subject to any disclaimer, the term of this patent is extended or adjusted under 35 U.S.C. 154(b) by 0 days.

(21) Appl. No.: 11/385,306

(22) Filed: Mar. 21, 2006

(65) Prior Publication Data
US 2007/0024945 A1 Feb. 1, 2007

(30) Foreign Application Priority Data
Aug. 1, 2005 (TW) .............................. 94126117 A

(51) Int. Cl.
*G02B 27/14* (2006.01)
(52) U.S. Cl. .................. 359/634; 359/649; 359/629
(58) Field of Classification Search ............... 359/634, 359/649, 629, 639, 626
See application file for complete search history.

(56) References Cited

U.S. PATENT DOCUMENTS

| | | | | |
|---|---|---|---|---|
| 5,777,796 | A * | 7/1998 | Burstyn ...................... | 359/634 |
| 6,407,868 | B1 * | 6/2002 | Ishibashi et al. ............ | 359/634 |
| 2005/0168697 | A1 * | 8/2005 | Bruzzone et al. ............ | 353/20 |
| 2005/0168708 | A1 * | 8/2005 | Huang ........................ | 353/81 |
| 2006/0187414 | A1 * | 8/2006 | Bell et al. ................... | 353/31 |

* cited by examiner

*Primary Examiner*—Hung Dang
*Assistant Examiner*—Vipin M Patel
(74) *Attorney, Agent, or Firm*—Patterson, Thuente, Skaar & Christensen, P.A.

(57) ABSTRACT

A digital light-processing projection apparatus includes a light source, a beam splitter module and an optical combiner module. The beam splitter module is used in conjunction with an optical combiner module that includes combiners and a plurality of prisms. The beam splitter module comprises a beam splitter element for splitting the beam into a plurality of color lights that pass through the respective prisms separately. The polarization direction of each color light when separated in the beam splitter module is equal to the polarization direction of each respective color light when colour combination in the combiner module.

35 Claims, 8 Drawing Sheets

DIGITAL LIGHT-PROCESSING PROJECTION APPARATUS AND BEAM SPLITTER MODULE THEREOF

BACKGROUND OF THE INVENTION

1. Field of the Invention

The present invention relates to a digital light-processing projection apparatus and a beam splitter module used in conjunction with the projection apparatus, and especially relates to the design of the digital light-processing projection apparatus and a beam splitter element of the beam splitter module.

2. Descriptions of the Related Art

FIG. 1 is a schematic view of a digital light-processing projection apparatus disclosed in ROC (Taiwan) Patent Application No. 093101928, which was filed by the assignee of the subject application on 29 Jan. 2004. The digital light-processing projection apparatus comprises an optical combiner module 200, a light source 300, a beam splitter module 400, a plurality of Digital Micro-mirror Devices (DMDs) 500R, 500G, 500B, and a projection lens 600.

A light beam W is emitted from the light source 300, passes through a rod integrator 310 and enters the beam splitter module 400, which in turn, splits the light beam W into three primary colour lights R, G, B. Dichroic mirrors 402, 404 split colour lights R, G and colour light B, respectively. Colour lights R, G, B then enter the optical combiner module 200 by respective condenser lenses 406, 408, 410 and reflection mirrors 412, 414, 416, 418, 420 and 422. Colour light B is reflected onto incident plane 242a, while colour light G is reflected onto incident plane 232a. Colour light R, G, B are reflected onto the respective DMDs 500R, 500G, 500B by respective air gaps in Total Internal Reflection (TIR) prisms 220a, 230a, 240a, from which they are subsequently reflected and pass through the respective TIR prisms 220a, 230a, 240a. The projection lens 600 is disposed in the light paths of the respective colour lights R, G, B after the optical combiner module 200. Back focal length 550 is the back focal length of the digital light-processing projection apparatus.

As shown in FIG. 2A, which illustrates a spectrum curve diagram of the colour light R in the beam splitter module 400. Curve S1 represents the spectrum of S-polarized light when the incident angle of colour light R is 45 degrees. Curve P1 represents the spectrum of P-polarized light when the incident angle of colour light R is 45 degrees. Curve S2 represents the spectrum of S-polarized light when the incident angle of colour light R is 52 degrees. Curve P2 represents the spectrum of P-polarized light when the incident angle of colour light R is 52 degrees.

Referring to FIG. 2B, which illustrates a spectrum curve diagram of the colour light R in the optical combiner module 200. Curve S3 represents the spectrum of S-polarized light when the incident angle of colour light R is 45 degrees. Curve P3 represents the spectrum of P-polarized light when the incident angle of colour light R is 45 degrees. Curve S4 represents the spectrum of S-polarized light when the incident angle of colour light R is 52 degrees. Curve P4 represents the spectrum of P-polarized light when the incident angle of colour light R is 52 degrees.

Now referring to FIGS. 2A and 2B, as shown in curves S1, P1, S3 and P3, when the wave length of S-polarized light of colour light R is greater than 570 nm, the S-polarized light of colour light R starts to reflect, while the P-polarized light of colour light R does not reflect until the wave length thereof is greater than 600 nm and the rate of reflection is close to 100%. In other words, the S-polarized light is more suitable for reflection regardless of light splitting or combining.

After two reflections of fold mirrors, the S-polarized light of red light is converted to the P-polarized light. As for curve S1, when the S-polarized light of colour light R in the beam splitter module 400 enters the optical combiner module 200, the curve spectrum becomes curve P3.

Given above, when the wave length of the S-polarized light of colour light R in the beam splitter module 400 is between 570 nm and 600 nm, the light will be transmitted in the optical combiner module 200, which in turn, results in light loss. The same also applies to colour lights B and G. If light loss occurs, the intensity of images by the projection lens is reduced, which in turn, affects the quality and effects of projected images.

SUMMARY OF THE INVENTION

Accordingly, it is an object of the present invention to provide a digital light-processing projection apparatus and a beam splitter module to make the direction of image plane of each split polarized light be equal to that of each polarized light of the respective colour light during light combining in the optical combiner module so light loss can be avoided.

The present invention provides a beam splitter module used in conjunction with an optical combiner module. The optical combiner module comprises a combiner; and a plurality of prisms. The combiner comprises at least one pared-corner, and one side of the prisms is disposed adjacent to the pared-corner. The beam splitter module comprises a beam splitter element for splitting a light beam into a plurality of colour lights passing through the respective prisms separately. Wherein the polarization direction of each colour light split by the beam splitter module is equal to that of each respective polarization of colour light during light combination in the optical combiner module.

The other object of the present invention is to provide a digital light-processing projection apparatus. The projection apparatus comprises a light source, a beam splitter module, an optical combiner module, a plurality of Digital Micromirror Devices (DMDs) and a projection lens.

The beam splitter module comprises a beam splitter element disposed in the light path of the light beam emitted from the light source, wherein the beam splitter module splits the light beam into a plurality of colour lights.

The optical combiner module is disposed at an intersection of the plurality of colour lights after the light splitter module. The optical combiner module comprises a combiner and a plurality of prisms. The combiner comprises at least one pared-corner, and one side of the prisms is disposed adjacent to the pared-corner.

The plurality of DMDs are disposed in the light paths of the respective colour lights after the optical combiner module. The plurality of colour lights are reflected onto the DMDs by the respective prisms and are subsequently reflected by the respective DMDs to pass through the respective prisms, wherein the direction of image plane of each polarized light of the respective colour light split by the beam splitter module is equal to that of each respective polarized light of colour light during light combining in the optical combiner module.

Other objects, advantages and novel features of the present invention will be drawn from the following detailed description of preferred embodiments of the present invention with the accompanying drawings, in which:

DESCRIPTION OF THE PREFERRED EMBODIMENT

Figure 1:
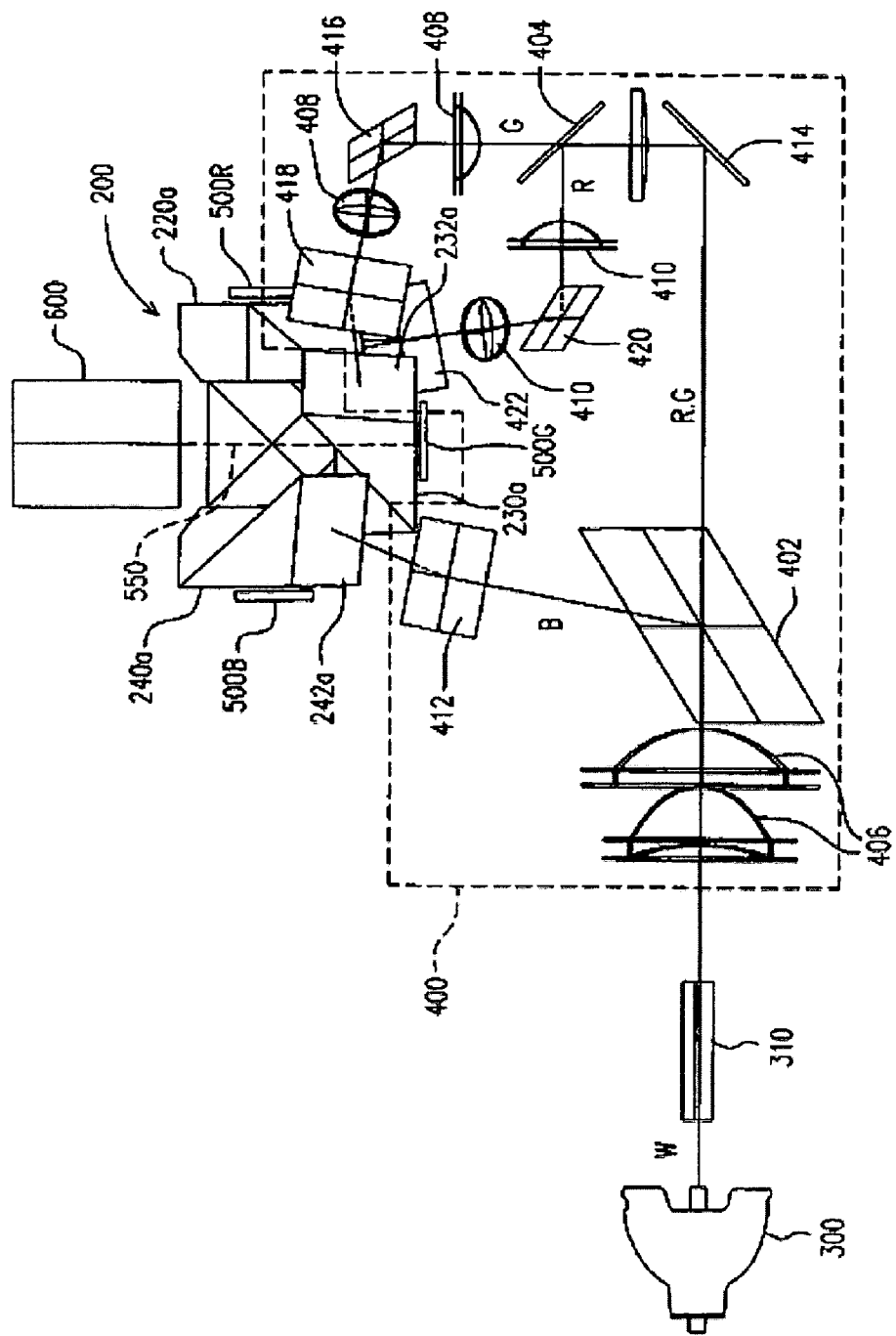
FIG. 1 illustrates a schematic view of a digital light-processing projection apparatus disclosed in ROC (Taiwan) Patent Application No. 093101928.
Figure 2A:
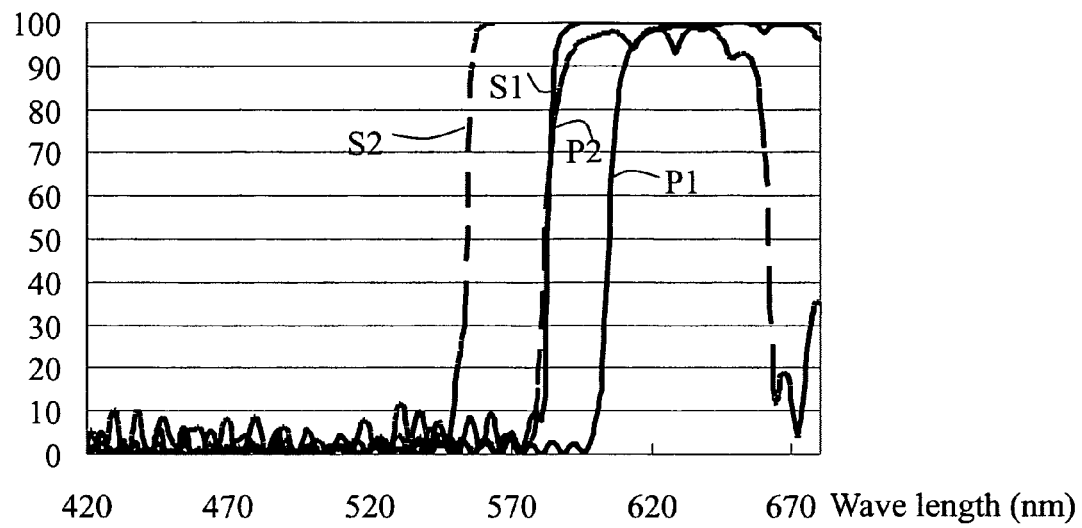
FIG. 2A illustrates a spectrum curve diagram of the colour light R in a beam splitter module in FIG. 1.
Figure 2B:
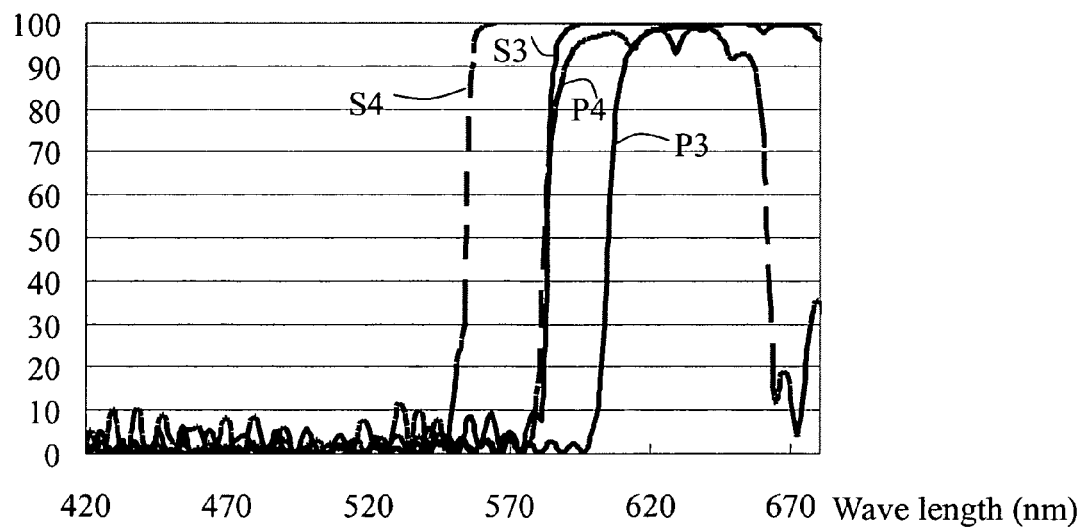
FIG. 2B illustrates another spectrum curve diagram of the colour light R in a optical combiner module in FIG. 1.
Figure 3:
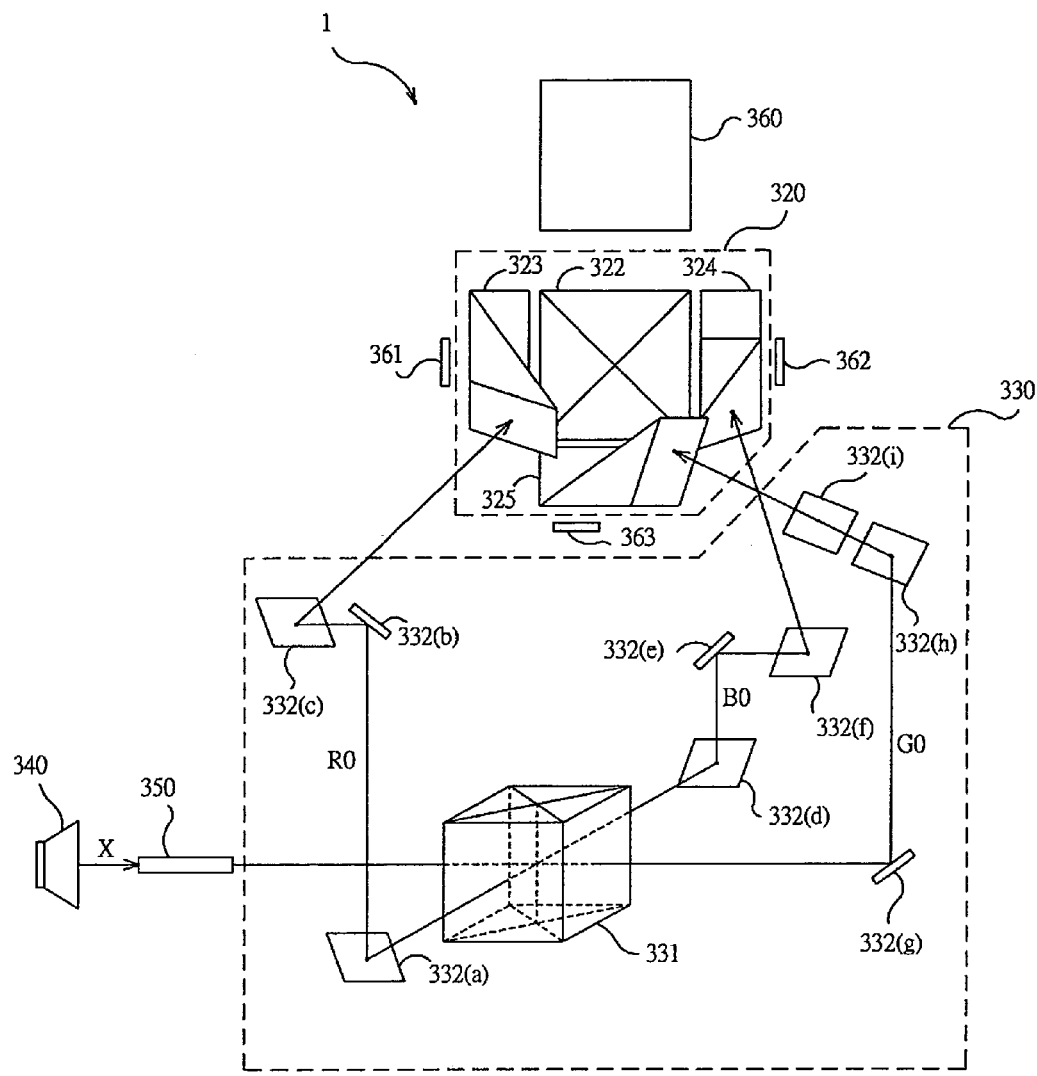
FIG. 3 illustrates an exploded view of a preferred embodiment of a digital light-processing projection apparatus according to the present invention.

FIG. 3 illustrates a preferred embodiment of a digital light-processing projection apparatus 1 according to the present invention. The projection apparatus 1 comprises a light source 340, a rod integrator 350, a beam splitter module 330, an optical combiner module 320, a plurality of Digital Micro-mirror Devices (DMDs) 361, 362, 363, and a projection lens 360.

A light beam X is emitted from the light source 340, which usually comprises, for example but not limited to, a metal-halide lamp (MHL) or an ultra-high performance (UHP) lamp, which can provide high brightness and high colour saturation white light. The light beam X becomes uniform by rod integrator 350 then enters the beam splitter module 330. The beam splitter module 330 splits the light beam X into three primary colour lights, i.e., red light R0, green light G0 and blue light B0, which subsequently enter the optical combiner module 320. The optical combiner module 320 receives red light R0, green light G0 and blue light B0 from the beam splitter module 330 and forms images on DMDs 361, 362, 363. After the optical combiner module 320, three colour images are projected by the projection lens 360. The following paragraphs describe each element of the digital light-processing projection apparatus in order.

The beam splitter module 330 comprises a beam splitter element 331 and reflection mirrors 332(a)~(i). Red light R0 and blue light B0 are reflected towards different directions (e.g., left and right, up and down, respectively) by the beam splitter module 331 while green light G0 passes through it.

Figure 4A:
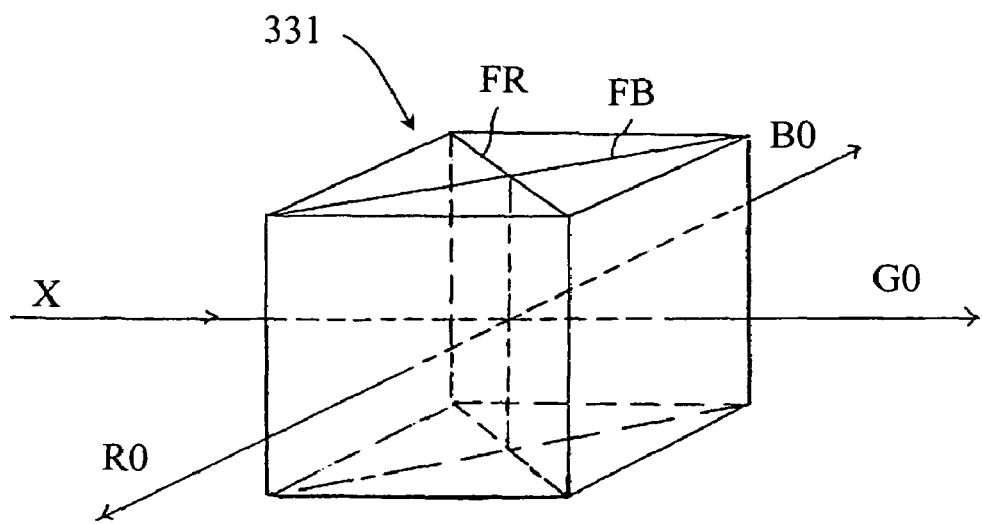
FIG. 4A illustrates a schematic view of a preferred embodiment of a beam splitter element according to the present invention.

FIG. 4A illustrates a schematic view of a preferred embodiment of the beam splitter 331 according to the present invention. Preferably, the beam splitter element 331 is an X-plate. The inside of the beam splitter element 331 is disposed with optical coating FR and optical coating FB. The red light R0 of the light beam X is reflected by the optical coating FR. The blue light B0 of the light beam X is reflected by the optical coating FB. Nevertheless, the green light G0 is unaffected and passes through the beam splitter element 331 directly.

Figure 4B:
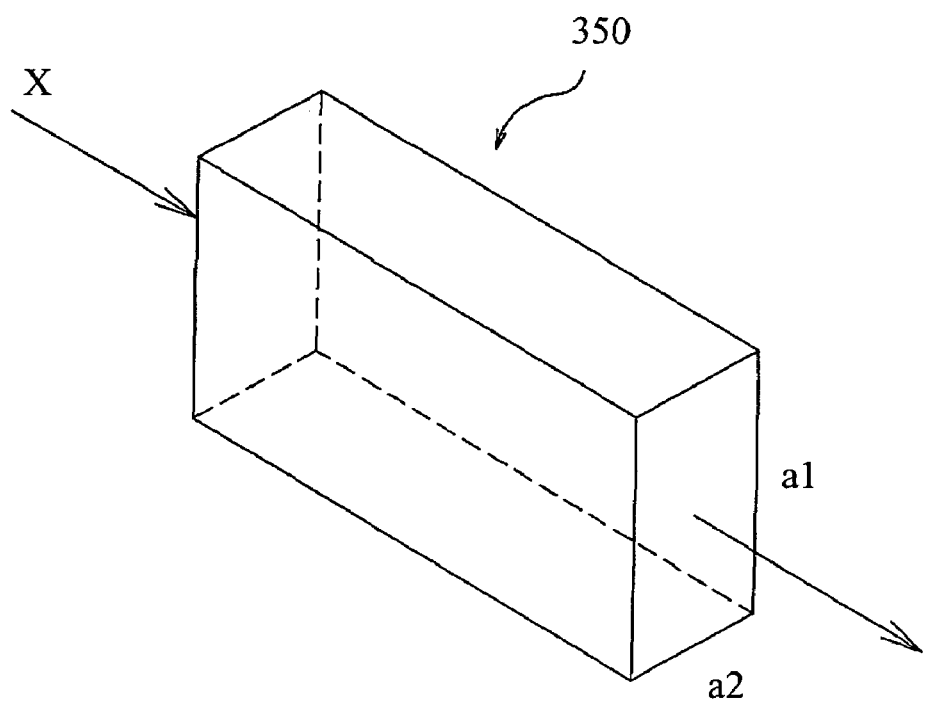
FIG. 4B illustrates a schematic view of a rod integrator according to the present invention.

FIG. 4B illustrates a schematic view of the rod integrator 350. The rod integrator 350 has an output end having a length a1 and a width a2. In the preferred embodiment, the ratio of the length a1 and width a2 is 16:9, and the length a1 is perpendicular to the horizontal direction. In the beam splitter element 331, the direction of reflection of the red light R0 reflected by the optical coating FR is, for example, parallel to the length a1, or beneath the beam splitter element 331 (e.g., from the bottom of the beam splitter element 331). The direction of reflection of the blue light B0 reflected by the optical coating FB is, for example, parallel to the length a1, or above the beam splitter element 331 (e.g., from the top of the beam splitter element 331). Nevertheless, the arrangement of the above mentioned upwardly and downwardly reflected blue light and red light is only one of the possible embodiments.

Figure 5B:
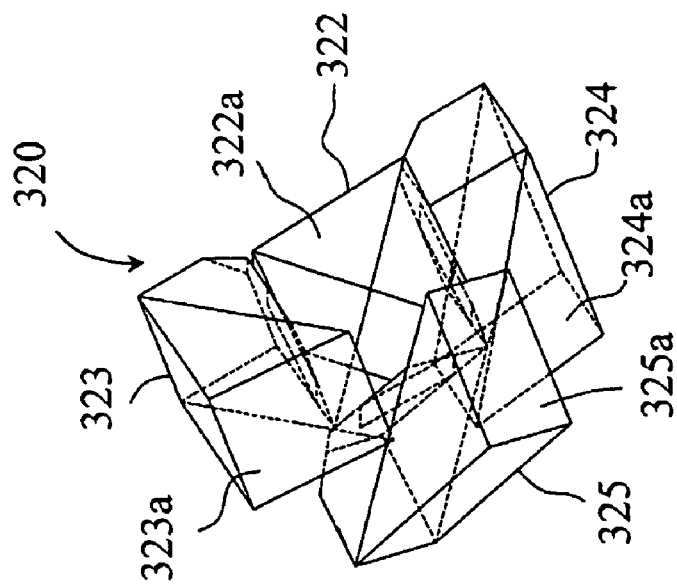
FIG. 5B illustrates a transparent schematic view of the optical combiner module in FIG. 5A.
Figure 5A:
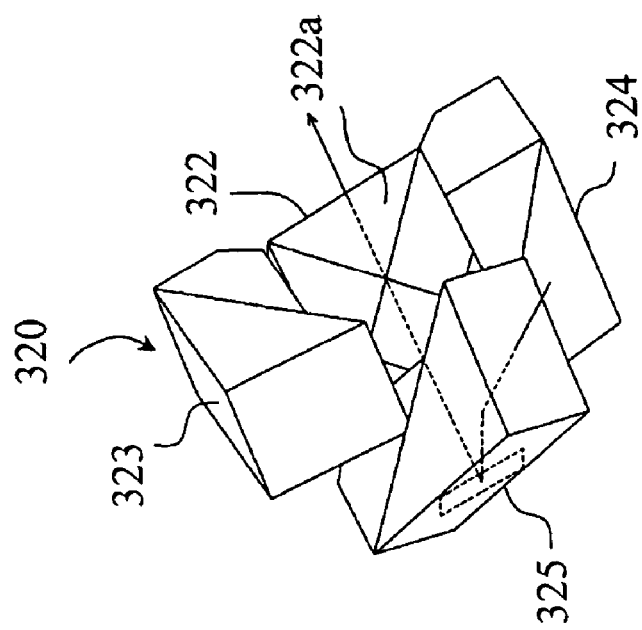
FIG. 5A illustrates a perspective view of a preferred embodiment of an optical combiner module according to the present invention.

FIG. 5A illustrates a perspective view of a preferred embodiment of an optical combiner module according to the present invention, while FIG. 5B illustrates a transparent schematic view of the optical combiner module in FIG. 5A. The optical combiner module 320 of the embodiment comprises a combiner 322 and a plurality of prisms 323, 324, 325 adjacent to the combiner 322. Although three prisms 323, 324, 325 are used in the embodiment, the number of prisms used in the present inventions is not limited to three. In addition, the prisms 323, 324, 325 adjacent to the combiner 322 can be integrated to the combiner 322 by any means either directly or indirectly.

The reflection mirrors 332(a)~(i) are utilized to continuously reflect the three primary lights R0, G0 and B0 to the optical combiner module 320. For instance, the reflection mirrors 332(a)~(c) continuously reflect the red light R0 to the prism 323, the reflection mirrors 332(d)~(f) continuously reflect the blue light B0 to the prism 324, and the reflection mirrors 332(g)~(i) continuously reflect the green light G0 to the prism 325.

Figure 6B:
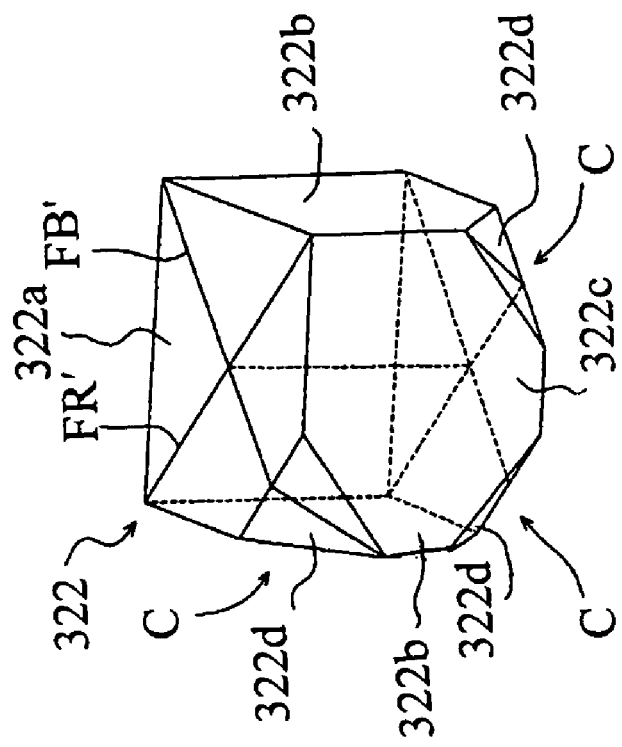
FIG. 6B illustrates a transparent schematic view of the combiner in FIG. 5A.
Figure 6A:
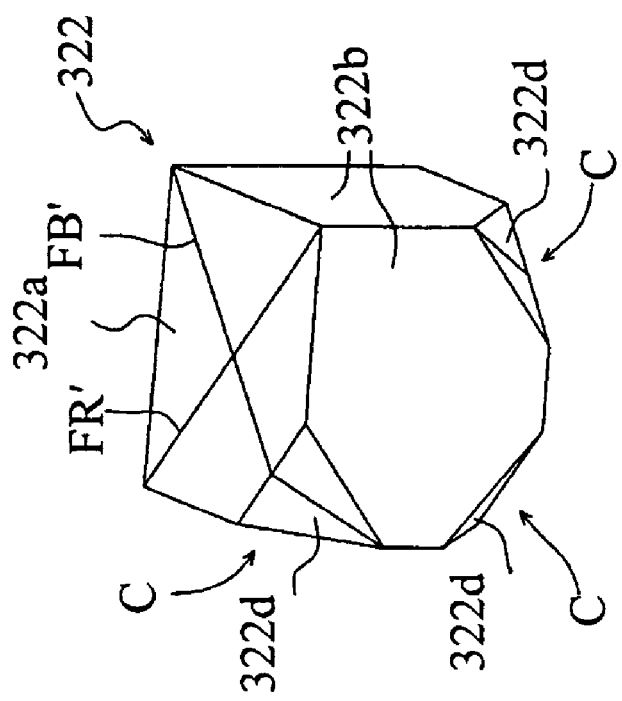
FIG. 6A illustrates a perspective view of a combiner in FIG. 5A.

FIGS. 6A and 6B illustrate a perspective view and a transparent schematic view of the combiner in FIG. 5A, respectively. In the embodiment, the combiner 322 comprises at least one pared-corner C. Although three pared-corners C are used in the embodiment, the number of pared-corners is not limited to three and can actually depend on what is required.

The combiner 322 of the embodiment can be an X-prism or other optical element capable of optically combining. Taking the X-prism as an example, the inside of the prism can have two optical coatings FR', FB', where FR' can reflect a light having a wave length of red light, and FB' can reflect a light having a wave length of blue light. In addition, the above mentioned X-prism is substantially a regular hexahedron, which usually has four sides 322b, a top surface 322a, a bottom surface 322c and three lean surfaces 322d. The top surface 322a and the bottom surface 322c are adjacent to the side 322b, respectively. A portion of the lean surfaces 322d is adjacent to the top surface 322a and one of the sides 322b, while the other portion of the lean surfaces 322d is adjacent to the bottom surface 322c and one of the sides 322b. The shape of lean surfaces 322d of the pared-corners C of the combiner 322 is, for example, a regular triangle.

Referring to FIGS. 5A, 5B, 6A and 6B, one side of the prisms 323, 324, 325 is disposed adjacent to the pared-corner C of the combiner 322 so that the volume of the optical combiner module 320 can be effectively reduced.

Figure 7C:
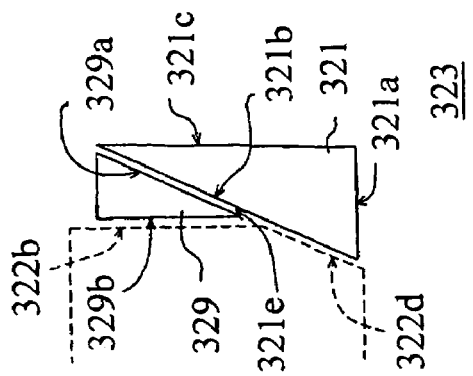
FIG. 7C illustrates a side view of the total internal reflection prism in FIG. 5A.
Figure 7B:
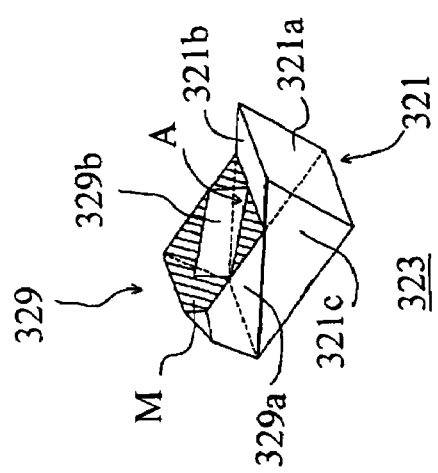
FIG. 7B illustrates a transparent schematic view of the total internal reflection prism in FIG. 5A.
Figure 7A:
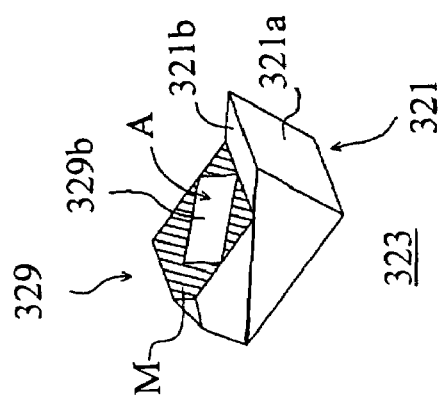
FIG. 7A illustrates a perspective view of a total internal reflection prism in FIG. 5A.

FIGS. 7A, 7B and 7C illustrate a perspective view, a transparent schematic view and a side view of a total internal reflection (TIR) prism in FIG. 5A. The prisms 323, 324, 325 of this embodiment can be, for example, TIR prisms. The TIR prism 323 is described in more detail as an example as follows.

TIR prism 323 comprises a first prism 321 and a second prism 329. The first prism 321 comprises a first light incident plane 321a, a first contact surface 321b and a first light exit plane 321c. The second prism 329 comprises a second contact surface 329a and a second light exit plane 329b. In addition, inside the TIR prism 323, the second light exit plane 329b of the second prism 329 has, for example, a transparent region A and a light-shielding region M, where the light-shielding region M is used to filter spurious lights.

Referring to FIG. 7C, inside the TIR prism 323, an air gap 321e is formed between a portion of the first contact surface 321b and the second contact surface 329a, while the other portion of the first contact surface 321b is disposed adjacent to one of the lean surfaces 322d of the combiner 322, and the second light exit plane 329b is disposed adjacent to one of the sides 322b.

Now referring to FIGS. 5B and 7C, in the embodiment, the TIR prism 323 is, for example, a red light TIR prism, the TIR prism 324 is, for example, a blue light TIR prism, and the TIR prism 325 is, for example, a green light TIR prism, where the red light TIR prism 323 and the blue light TIR prism 324 are disposed at opposite sides of the combiner 322. Each side 323a, 324a, 325a of the TIR prisms 323, 324, 325 is on a first plane (not shown in the figures), the top surface 322a of the combiner 322 is on a second plane (not shown in figures), and an angle between the first plane and the second plane is about 45 degrees.

A blue light reflecting coating is further disposed inside the red light TIR prism 323. The blue light reflecting coating is disposed, for example, on the first contact surface 321b of the first prism 321, or on the second contact surface 329a of the second prism 329, to filter spurious lights other than blue light. In addition, for example, a red light reflecting coating is disposed inside the blue light TIR prism 324 to filter spurious lights other than red light.

Digital Micro-mirror Devices (DMDs) 361, 362, 363 are disposed in the light paths of the respective colour lights R0, G0, B0 after the optical combiner module 320. The colour lights R0, G0, B0 are reflected onto the respective DMDs 361, 362, 363 by the respective air gaps of the TIR prisms 323, 324, 325, from which they are subsequently reflected by the respective DMDs 361, 362, 363 to pass through the respective TIR prisms 323, 324, 325. The projection lens 360 is disposed in the combined light path after the optical combiner module 320.

When colour lights R0, G0, B0 are combined in the combiner, compared the combined light beam with the light beam X at the output end of the rod integrator 350, during the transmission of colour lights, the image plane of the combined light beam is that of the light beam X rotated by 90 degrees. For example, when the light beam X passes through the rod integrator 350, the length is perpendicular to the ground, while the width is parallel to the ground. To suit a viewer's viewing effects, the length of the combined light beam is parallel to the ground, while the width thereof is perpendicular to the ground, and the ratio of the length to the width is 16:9.

Figure 8:
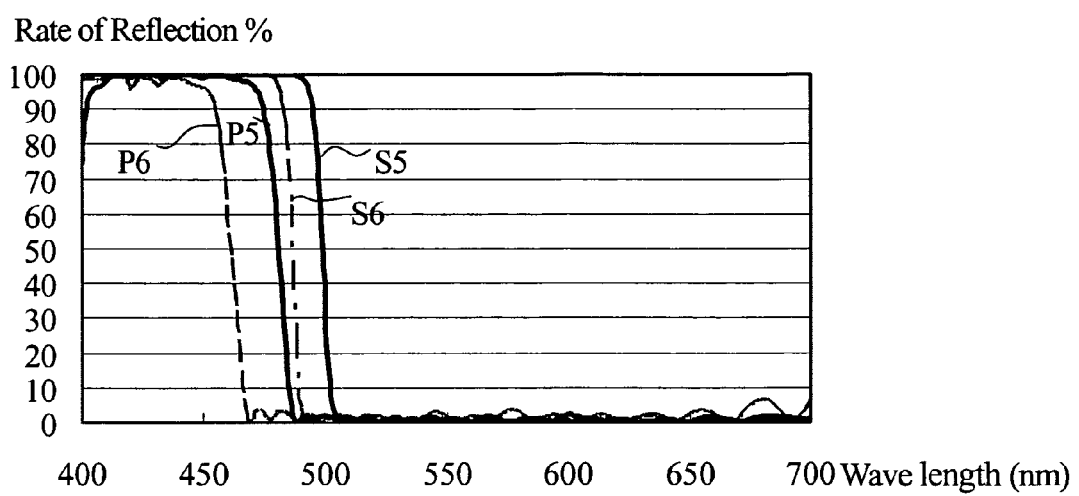
FIG. 8 illustrates a spectrum curve diagram of a colour light B0 in a preferred embodiment of a beam splitter element.

Now referring to FIG. 8, which illustrates a spectrum curve diagram of colour light B0 in the beam splitter module 330. When the incident angle of colour light B0 is 45 degrees, curve S5 represents the spectrum of S-polarized light thereof, while curve P5 represents the spectrum of P-polarized light thereof. When the incident angle of colour light B0 is 52 degrees, curve S6 represents the spectrum of S-polarized light thereof, while curve P6 represents the spectrum of P-polarized light thereof.

After the optical combiner module 330, contrary to the prior art, the S-polarized and P-polarized lights of the colour light B0 will not come into the situation where the directions of image planes of the S-polarized and P-polarized lights thereof are different. This is to say, during combining of the colour light B0, no lights having a certain wave length will be transmitted because they are not reflected. Therefore, in the optical combiner module 320, the spectrum curve of the colour light B0 does not change. In other words, the direction of S-polarized light of the split colour light B0 is equal to that of S-polarized light of the combined colour light B0. Similarly, for colour lights R0 and G0, the directions of S-polarized lights are the same when both separation and combination of the colour lights. Therefore, no light loss occurs.

From the above. it is clear that when using the digital light-processing projection apparatus and the beam splitter module according to the present invention, each colour light will have no light loss so that the quality of the projected images at the last stage is ensured. Due to the configuration of tight contacts between prisms, the light path of each colour light is shortened, and the size of the digital light-processing projection apparatus becomes more compact when manufactured, which is more acceptable to the users and therefore enhances competitiveness in the market.

While the invention has been described in terms of several preferred embodiments, those persons skilled in the art will recognize that the invention can still be practiced with modifications, within the spirit and scope of the appended claims.

What is claimed is:

1. A beam splitter module used in conjunction with a rod integrator and an optical combiner module having a combiner and a plurality of prisms, the beam splitter module comprising:

a beam splitter element for splitting a light beam that exits the rod integrator, the light beam exiting the rod integrator having a first cross section that defines a first length and a first width, the first length being greater than the first width, the light beam being split into a plurality of colour lights for exiting the splitter module, each one of the plurality of colour lights entering a respective one of the plurality of prisms of the optical combiner module, each colour light exiting the beam splitter module having at least one polarized light, and each colour light during light combining in the optical combiner module having at least one polarized light, wherein the light beam exits the optical combiner module after combining by the optical combiner having a second cross section that defines a second length and a second width, the second length being greater than the second width, the second length being at a right angle relative to the orientation of the first length of the first cross section, the splitting of the light beam occuring vertically while the light combining occurs horizontally, so that the polarization direction of each polarized light of the respective colour light split by the beam splitter module is equal to that of each respective polarized light of said colour light during light combining in the optical combiner module.

2. The beam splitter module according to claim 1, wherein the beam splitter element is an X-plate.

3. The beam splitter module according to claim 1, wherein said polarized light is an S-polarized light of the respective colour light.

4. The beam splitter module according to claim 1, wherein said polarized light is a P-polarized light of the respective colour light.

5. The beam splitter module according to claim 1, wherein the beam splitter module further comprises a plurality of reflection mirrors disposed in the light paths of the respective colour lights between the beam splitter element and the respective prisms.

6. The beam splitter module according to claim 1, wherein the plurality of colour lights comprise a first colour light, a second colour light and a third colour light.

7. The beam splitter module according to claim 6, wherein the first colour light is a red light, the second colour light is a blue light, and the third colour light is a green light.

8. The beam splitter module according to claim 6, wherein the beam splitter element comprises a first colour light coating for reflecting the first colour light and a second colour light coating for reflecting the second colour light.

9. The beam splitter module according to claim 8, wherein the third colour light directly passes through the beam splitter element.

10. The beam splitter module according to claim 8, each direction of reflection of the first colour light and the second colour light from the beam splitter module is parallel to the length of an output end of the rod integrator.

11. The beam splitter module of claim 1 wherein the first cross section is of a rectangular shape.

12. A digital light-processing projection apparatus, comprising:
a light source for emitting a light beam, the light beam passing through a rod integrator, the light beam exiting the rod integrator and having a first cross section that defines a first length and a first width, the first length being greater than the first width;
a beam splitter module comprising a beam splitter element disposed in the light path of the light beam emitted from the light source, the beam splitter module splitting the light beam that exits the rod integrator into a plurality of colour lights;
an optical combiner module disposed at an intersection of the plurality of colour lights after the light splitter module, the optical combiner module comprising a combiner and a plurality of prisms adjacent to the combiner;
a plurality of Digital Micro-mirror Devices (DMDs) operatively coupled with the optical combiner module, each of the respective one of the plurality of colour lights being reflected onto a respective one of the plurality of DMDs by the respective one of the plurality of prisms and subsequently reflected by the respective one of the plurality of DMDs to pass through the respective one of the plurality of prisms; and
a projection lens disposed in the light path after the optical combiner module;
wherein the light beam exiting the projection lens has a second cross section that defines a second length and a second width, the second length being greater than the second width, the second length being at a right angle relative to the orientation of the first length of the first cross section, the splitting of the light beam occuring vertically while the light combining occurs horizontally, so that the polarization direction of the respective colour light split by the beam splitter module is equal to that of each respective polarized light of the colour light during light combining in the optical combiner module.

13. The digital light-processing projection apparatus according to claim 12, wherein the beam splitter element is an X-plate.

14. The digital light-processing projection apparatus according to claim 12, wherein said polarized light is an S-polarized light of the respective colour light.

15. The digital light-processing projection apparatus according to claim 12, wherein said polarized light is a P-polarized light of the respective colour light.

16. The digital light-processing projection apparatus according to claim 12, wherein the beam splitter module further comprises a plurality of reflection mirrors disposed in the light paths of the respective colour lights between the beam splitter element and the respective prisms.

17. The digital light-processing projection apparatus according to claim 12, wherein the plurality of colour lights comprise a first colour light, a second colour light and a third colour light.

18. The digital light-processing projection apparatus according to claim 17, wherein the first colour light is a red light, the second colour light is a blue light, and the third colour light is a green light.

19. The digital light-processing projection apparatus according to claim 17, wherein the beam splitter element comprises a first colour light coating for reflecting the first colour light and a second colour light coating for reflecting the second colour light.

20. The digital light-processing projection apparatus according to claim 19, wherein the third colour light directly passes through the beam splitter element.

21. The digital light-processing projection apparatus according to claim 19, wherein the light beam is uniformized by the rod integrator and enters the beam splitter module and wherein each direction of reflection of the first colour light and the second colour light from the beam splitter module is parallel to the length of an output end of the rod integrator.

22. The digital light-processing projection apparatus according to claim 12, wherein the combiner comprises at least one pared-corner, and one side of one of the prisms is disposed adjacent to the pared-corner.

23. The digital light-processing projection apparatus according to claim 22, wherein the shape of a lean surface of the pared-corner of the combiner is a regular triangle.

24. The digital light-processing projection apparatus according to claim 22, wherein the combiner has four sides, a top surface, a bottom surface and three lean surfaces; the top surface and the bottom surface are adjacent to the sides, respectively; a portion of the lean surfaces is adjacent to the top surface and one of the sides, while the other portion of the lean surfaces is adjacent to the bottom surface and one of the sides.

25. The digital light-processing projection apparatus according to claim 24, wherein the prisms comprise three Total Internal Reflection (TIR) prisms, and each of the TIR prisms comprises:
a first prism comprising a first light incident plane, a first contact surface and a first light exit plane; and a second prism comprising a second contact surface and a second light exit plane, wherein an air gap is formed between a portion of the first contact surface and the second contact surface, the other portion of the first contact surface is disposed adjacent to one of the lean surfaces, and the second light exit plane is disposed adjacent to one of the sides.

26. The digital light-processing projection apparatus according to claim 25, wherein each side of the TIR prisms is on a first plane, the top surface of the combiner is on a second plane, and an angle between the first plane and the second plane is about 45 degrees.

27. The digital light-processing projection apparatus according to claim 25, wherein the TIR prisms comprise a red light TIR prism, a blue light TIR prism and a green light TIR prism, and the red light TIR prism and the blue light TIR prism are disposed at opposite sides of the combiner.

28. The digital light-processing projection apparatus according to claim 27, further comprising:

a blue light reflecting coating disposed inside the red light TIR prism; and a red light reflecting coating disposed inside the blue light TIR prism.

29. The digital light-processing projection apparatus according to claim 25, wherein the second light exit plane of the second prism comprises a transparent region and a light-shielding region.

30. The beam splitter module of claim 12 wherein the first cross section is of a rectangular shape.

31. A digital light-processing projection apparatus comprising:

a beam splitter module including a beam splitter element for splitting an incoming light beam into a plurality of split beams of colour, the plurality of split beams of colour lying substantially on a first plane, each of the plurality of split beams of colour having at least one s-polarized light exiting the beam splitter element, the s-polarized light being converted to a p-polarized light relative to the beam splitter element before exiting said beam splitter module; and a combiner module including a combiner element, the combiner module being operatively coupled with the beam splitter module for combining the plurality of split beams of colour, the plurality of split beams of colour entering the combiner element on a second plane, said second plane being substantially orthogonal with the first plane so that the p-polarized light exiting the splitter module is received by the combiner element as s-polarized light.

32. The digital light-processing projection apparatus of claim 31 wherein:

the beam splitter element defines a first plurality of reflected spectrums, one for each of the at least one s-polarized lights exiting the beam splitter element, and;

the combiner element defines a second plurality of reflected spectrums, one for each of the at least one s-polarized lights exiting the combiner, the first plurality of reflected spectrums being substantially the same as the second plurality of reflected spectrums.

33. The digital light-processing projection apparatus according to claim 31, wherein the beam splitter module further comprises a plurality of reflection mirrors disposed in the light paths of the respective colour lights between the beam splitter element and the combiner module.

34. The digital light-processing projection apparatus according to claim 31, wherein the plurality of split beams of colour include a first colour light, a second colour light and a third colour light.

35. The digital light-processing projection apparatus according to claim 34, wherein the first colour light is a red light, the second colour light is a blue light, and the third colour light is a green light.

* * * * *